F. H. WILLIAMS.
CLUTCH.
APPLICATION FILED APR. 9, 1912.
1,055,433.
Patented Mar. 11, 1913.
2 SHEETS—SHEET 1.
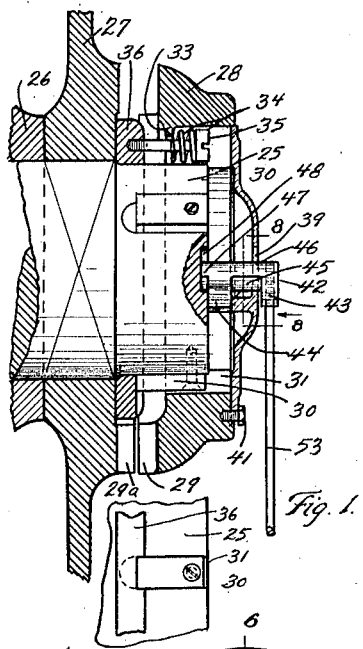
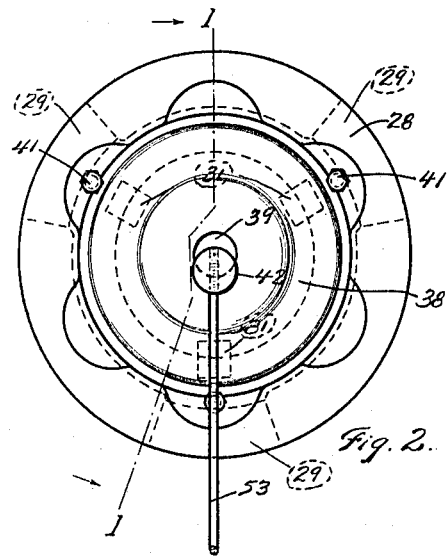
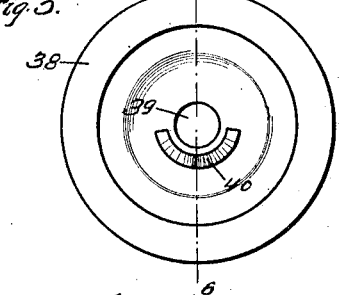
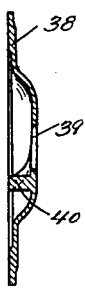
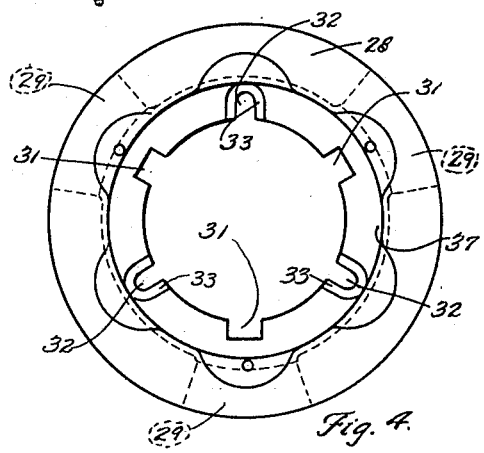
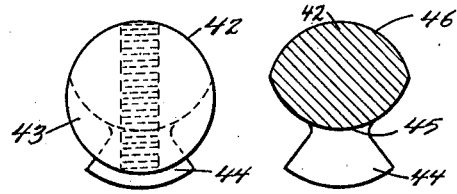
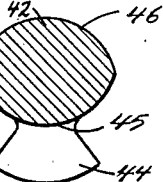
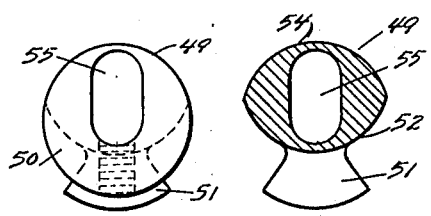
WITNESSES:
INVENTOR
Frank H. Williams
BY
J. W. M. Ellis
ATTORNEY

F. H. WILLIAMS.
CLUTCH.
APPLICATION FILED APR. 9, 1912.

1,055,433.

Patented Mar. 11, 1913.
2 SHEETS—SHEET 2.

WITNESSES:
Walter H. Kelley
Bessie E. Dempsey

INVENTOR
Frank H. Williams
BY J. Wm Ellis
ATTORNEY

UNITED STATES PATENT OFFICE.

FRANK H. WILLIAMS, OF BUFFALO, NEW YORK.

CLUTCH.

1,055,433.  Specification of Letters Patent.  Patented Mar. 11, 1913.

Application filed April 9, 1912. Serial No. 689,535.

*To all whom it may concern:*

Be it known that I, FRANK H. WILLIAMS, a citizen of the United States of America, residing at Buffalo, Erie county, and State of New York, have invented certain new and useful Improvements in Clutches, of which the following is a full, clear, and exact description.

As is well known to those skilled in the art, the clutches used at present, on, for instance, punching or shearing machinery, are provided with a stationary auxiliary point or bearing from which the clutch is operated. This point or bearing is carried either by the housing of the machine or by a separate housing or bracket attached thereto. This requires additional machine work on the heavy housing of the machine, as well as additional handling of the same and in these forms of clutches numerous small parts are required. In some of the present types of clutches, the clutch member is operated at a considerable distance from the center of the shaft, with the result that a long bearing for the said clutch member becomes necessary and the wear also of said clutch member is greatly increased.

In producing my invention the general object has been to overcome the above named objections and in so doing, I have provided a clutch which is mounted on the outer end of the machine shaft, thus allowing the driving gear or pulley to be placed next to the bearing of said shaft. This makes it possible to use a comparatively small shaft on the machine on which the clutch is used. My clutch is operated from the center of the shaft and against the end of the same, thus allowing the parts thereof to be small and few in number and therefore, cheap to manufacture. Furthermore, all the working parts of my clutch are housed, thus protecting them from dust and dirt and the resultant wear. Moreover, my clutch is very easily adjusted without requiring additional parts. Thus, it is possible to quickly change the point in its rotation at which it will be thrown into and out of engagement. The operating rod of the clutch may also be placed at any desired angle around the shaft and may be operated either by a pull or push.

Figure 9:
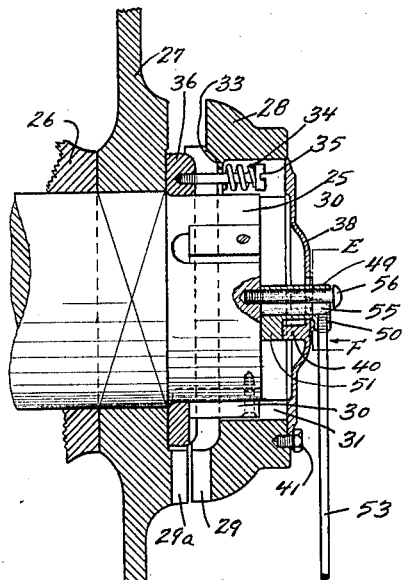
Figure 10:
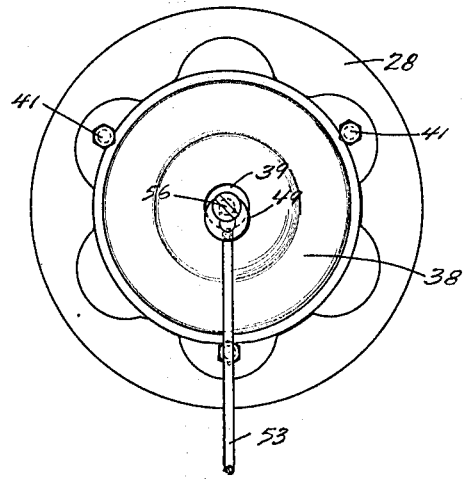
Figures 15, 16, 17:
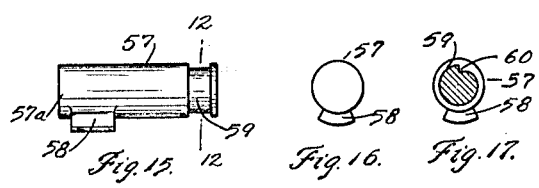
Figure 13:
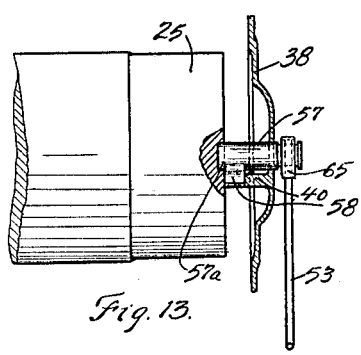
Figures 18, 19, 20, 21:
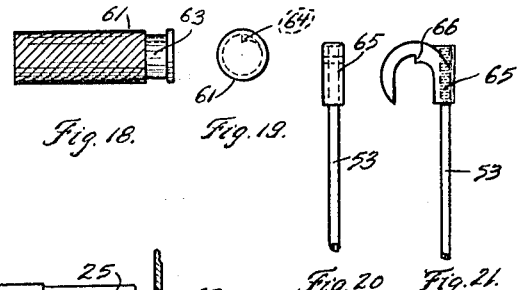
Figure 14:
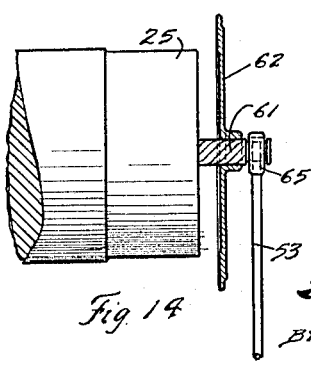

Reference is to be had to the accompanying drawings, forming part of this specification, in which like characters of reference indicate like parts throughout the several views of which:

Figure 1 is a sectional elevation of my clutch and is taken on line 1—1 of Fig. 2 and shows the clutch jaws of the clutch member and driving gear on the center line. Fig. 2 is a front elevation of the form of clutch shown in Fig. 1. Fig. 3 is a plan view of one of the keys and shows a fragmental part of the shaft to which it is attached. Fig. 4 is a front elevation of the sliding clutch member. Fig. 5 is an elevation of the cam plate as viewed from the interior. Fig. 6 is a sectional elevation of the same taken on line 6—6 of Fig. 5. Fig. 7 is an enlarged end elevation of the cam pin. Fig. 8 is a sectional end elevation of the said cam pin and is taken on line 8—8 of Fig. 1. Fig. 9 is a sectional elevation of a modified form of my clutch and is taken in the same manner as Fig. 2. Fig. 10 is a front elevation of the form shown in Fig. 9. Fig. 11 is an enlarged end view of the cam pin used in the form of clutch shown in Fig. 9. Fig. 12 is a sectional end elevation of the same taken on line 12—12 of Fig. 9. Fig. 13 is the cam plate, cam pin and end part of the shaft of a modified form of clutch. Fig. 14 is a similar view of another modified form of construction. Fig. 15 is an enlarged side elevation of the cam pin used in the modification shown in Fig. 13. Fig. 16 is an end elevation of the same. Fig. 17 is a sectional end elevation of the cam pin shown in Fig. 15 taken on line 17—17 of that figure. Figs. 18 and 19 show an enlarged side and end elevation of the cam pin used in the form of clutch shown in Fig. 14. Figs. 20 and 21 show an enlarged front and side elevation of the trip yoke and operating rod used in either of the forms of clutch shown in Figs. 13 or 14.

Referring now to Figs. 1 to 9 of the drawings, 25 represents the end portion of the shaft of the machine to which my clutch is attached. 26 is a fragmental portion of the bearing or housing of said machine and 27 is the driving gear or pulley of the machine. 28 is the sliding clutch member of my device, which is slidably mounted on the outer end of the shaft 25 and is provided with suitable jaws 29, which engage and co-act with similar jaws 29ª formed on the driving gear or pulley 27. Keys 30 are secured in the outer end of the shaft 25 and are engageable with suitable key ways 31 cut in the clutch member 28. These keys prevent the said clutch member from relative rotation with the shaft 25. Formed in the hub of the said clutch member are circular shaped recesses 32, which are each provided at their lower ends with a shoulder 33. In each of these recesses is disposed a helical spring 34, the lower end of which rests upon the shoulder 33 provided at the lower end of the recess. Passing through each of these springs is a bolt 35. These bolts are screw-threaded in an annular collar 36, which is rigidly secured to the shaft 25 and disposed preferably next to the driving gear or pulley 27. These springs which are preferably three in number, act to force the jaws 29 of the clutch member 28 into engagement with the co-acting jaws 29$^a$ on the driving gear or pulley 27. The outer face of the hub of the clutch member 28 is provided with a recess 37 in which is disposed the outer rim of the cam plate 38. This cam plate is preferably dished at the center and is provided with a central aperture 39. Concentric with the said aperture but disposed a slight distance away from the same is the cam 40 of the cam plate. The said cam plate is rotatable in the recess formed in the clutch member 28, so that it may be adjusted at will, and it is securely locked in position by means of the cam plate bolts 41. 42 is the cam pin of the clutch which is provided with a head 43 and a toe 44. The portion of the cam pin which lies between the head and toe thereof on one side is provided with a surface 45 which is eccentric with the surface 46 on the opposite side of the pin. The cam pin is provided at its inner end with a short inner end portion 47 which is of the same cross section as that part of the pin which lies between the head and toe of the same. The head of the cam pin is provided with a lateral screw-threaded aperture in which the upper end of the operating rod 53 is secured. This said cam pin is disposed through the center aperture of the cam plate and is so arranged that when in position and as shown in the drawings, the head 43 of the same projects out beyond the said cam plate. The toe of the said cam pin is disposed between the end of the shaft and the cam plate or the cam thereof. The inner end portion of the cam pin is disposed within an aperture 48 which is provided in the outer end of the shaft 25.

In the modified form shown in Figs. 9 to 12, the cam pin 49 is provided with a head 50 and toe 51 and has between the said head and toe on one side of the pin a surface 52 which is eccentric with the opposite surface 54 of the said pin. Through the center of the said pin is provided a longitudinal slot 55. In this slot is disposed a screw-threaded centering pin 56, the inner end of which is screw-threaded into the outer end of the shaft 25. The head 50 of this cam pin 56 has screw-threaded therein the upper end of the operating rod 53.

In the modifications shown in Figs. 13 and 15 to 17, the cam pin 57 is provided with a toe 58 and an inner end portion 57$^a$. The said inner end portion is disposed in an aperture provided in the outer end of the shaft 25 and serves to keep the said cam pin centered. The outer end of the said cam pin extends through the aperture in the said cam plate and is formed with an annular groove 59. The said groove 59 is provided with a cam-shaped notch 60, which is arranged to be engaged with the tripping mechanism hereinafter described.

In the modified form shown in Figs. 14, 18 and 19, the cam pin 61 is provided with a continuous cam which is preferably in the form of a double threaded coarse pitch screw, as shown in the drawings diagrammatically. This pin is screw-threaded through the center of the cam plate 62 and is rotatably carried thereby. The inner end of the cam pin 61 bears against the end of the shaft 25 and the outer end of said cam pin is provided with an annular groove 63 and cam-shaped notch 64.

In Figs. 20 and 21, I have shown the operating means for the forms of my invention, shown in Figs. 13 to 19, which comprise a trip yoke 65. This yoke is preferably U-shaped and provided at the bottom of the U with a shoulder 66, which is engageable with the cam-shaped notch 60 and 64 in the cam pins 57 and 61, when the said trip yoke is placed in the annular groove of the said pins. The yoke is provided at one side with a screw-threaded aperture and is so arranged that the operating rod 53 may be screwed therein from either side, thus making it possible to operate the clutch with a push or pull.

Having thus described my invention, I will now describe the operation of the forms of construction shown in Figs. 1 to 9. As shown in the drawings, the sliding clutch member is out of engagement and held in this position by reason of the engagement of the cam 40 with the toe of the cam pin. In this position the driving gear or pulley 27 is free to revolve upon the shaft 25. When the operating rod 53 is pushed upwardly, the cam pin will be raised to a point where the toe thereof will disengage from the cam on the cam plate. When so disengaged, the springs 34 will push the sliding clutch member 28 into engagement with the driving gear or pulley 27 and thus revolve the shaft of the machine. As the shaft revolves the cam on the cam plate will also be revolved and moved out of the way of the toe on the cam pin, which will allow the said cam pin to drop and again assume the position shown in the drawings. As the cam plate continues to revolve the cam thereon will become engaged with the toe of the cam pin, which will push the cam plate and the parts connected thereto away from the end of the shaft and thus disengage the clutch and stop the rotation of the said shaft.

In the two forms of clutches which I have just described the cam pin is operated in a reciprocatory manner, while in the forms shown in Figs. 13 and 14, the cam pins revolve when operated. In these forms, the shoulder 66 of the trip yoke is normally in engagement with the cam-shaped notch on the pins 57 and 61. When it is desired to operate the clutch, the trip yoke is raised by means of the operating rod 53, which permits the cam pin 57 and 61 to revolve. When so released, the pressure of the helical springs 34 is brought to bear on the cam plates and the cam pin 57 is caused to revolve by the inclined surface of the cam (see Fig. 13); or the cam pin 61 is caused to revolve by the inclined surfaces between the said cam pin and the cam plate (see Fig. 14). When so revolved the cam plate of either form will be drawn toward the end of the shaft by the helical springs and thus allow the sliding clutch member to engage with the driving gear or pulley of the machine, which will cause the shaft of the machine to revolve. Immediately after releasing the shoulder 66 of the trip yoke from engagement with the cam-shaped notch, the said trip yoke is allowed to fall and as the shaft continues to rotate the cam pin will also be rotated until the cam-shaped notches of either of the same again engage with the trip yoke, where it will be held against rotation. As the shaft continues to revolve, the cam in Fig 13 will be caused to ride on the toe of the cam pin or the cam pin in the form shown in Fig. 14 caused to screw into the cam plate and thereby draw the sliding clutch member out of its engagement with the driving gear or pulley.

When it is desired to change the cycle of operation of my clutch, it is only necessary to loosen the cam plate bolts 41 and revolve the cam plate 38 in the desired position. When set as desired, the cam plate bolts are again tightened up, whereupon the clutch is ready to operate.

Obviously, various modifications of the invention herein shown and described may be made without departing from the spirit of my invention or the scope of the appended claims, and I do not wish to be limited to the exact embodiment herein shown and described.

Having thus described my invention, what I claim is:

1. The combination with a shaft and a wheel, provided with clutch means, mounted to freely rotate thereon; of a clutch member non-rotatably mounted on the end of said shaft and axially slidable thereon, and wedge-shaped means disposed to act between the said shaft and the said clutch member.

2. The combination with a shaft and a wheel, provided with clutch means, mounted to freely rotate thereon; of a clutch member non-rotatably mounted on the end of said shaft and axially slidable thereon, springs carried by said clutch member for normally moving said member into engagement, and wedge-shaped means disposed to act between the said shaft and the said clutch member, whereby the clutch is engaged and disengaged.

3. The combination with a shaft and a wheel, provided with clutch means, mounted to freely rotate thereon; of a clutch member non-rotatably mounted on the end of said shaft and axially slidable thereon, wedge-shaped means disposed to act between the said shaft and the said clutch member and means for operating said wedge-shaped means.

4. The combination with a shaft and a wheel, provided with clutch jaws, mounted to freely rotate thereon; of a clutch member non-rotatably mounted on the end of said shaft and axially slidable thereon, a cam member carried by said clutch member and provided with a central aperture and a cam pin disposed in said central aperture and bearing against the end of said shaft, said cam member being provided with wedge-shaped means engageable with said cam pin.

5. The combination with a shaft and a wheel, provided with clutch means, mounted to freely rotate thereon; of a clutch member non-rotatably mounted on the end of said shaft and axially slidable thereon, an annular ring rigidly carried by said shaft and disposed between said clutch member and said wheel, said clutch member being formed with recesses, springs disposed in said recesses, fastening means passing through said springs and into said ring, a cam member carried by said clutch member provided with a central aperture and a cam pin disposed in said central aperture and bearing against the end of said shaft, said cam member being provided with wedge-shaped means engageable with said cam pin, whereby the clutch is engaged and disengaged.

6. The combination with a shaft and a wheel, provided with clutch means, mounted to freely rotate thereon; of a clutch member non-rotatably mounted on the end of said shaft and axially slidable thereon, an annular ring rigidly carried by said shaft and disposed to act between said clutch member and said wheel, said clutch member being formed with recesses, springs disposed in said recesses, fastening means passing through said springs and into said ring, a cam member carried by said clutch member and provided with a central aperture, a cam pin disposed in said central aperture and bearing against the end of said shaft, said cam member being provided with wedge-shaped means engageable with said cam pin and means for operating said cam pin, whereby the clutch is engaged and disengaged.

7. The combination with a shaft and a wheel, provided with clutch means, mounted to freely rotate thereon; of a spring-pressed clutch member non-rotatably mounted on the end of said shaft and axially slidable thereon, a cam plate carried by the outer face of said clutch member and provided with a central aperture and a cam concentric with said aperture, a cam pin provided with a head and a toe, said cam pin being disposed through said aperture and having the toe thereof engageable with the end of said shaft and said cam, to press the same apart and means for releasing said toe from engagement with said cam.

8. The combination with a shaft and a wheel, provided with clutch means, mounted to freely rotate thereon; of a spring-pressed clutch member non-rotatably mounted on the end of said shaft and axially slidable thereon, a cam plate carried by the outer end of said clutch member and provided with a central aperture and a cam concentric with said aperture, a cam pin provided with a head and a toe, the surface of said cam pin between the head and toe thereof, on one side, being eccentric with the surface on the opposite side, said cam pin being disposed through said aperture and having the toe thereof engageable with the end of said shaft and said cam, to press the same apart and means for releasing said toe from engagement with said cam.

9. The combination with a shaft and a wheel, provided with clutch means, mounted to freely rotate thereon; of a spring-pressed clutch member non-rotatably mounted on the end of said shaft and axially slidable thereon, a cam plate carried by the outer face of said clutch member and provided with a central aperture and a cam concentric with said aperture, a cam pin provided with a head and a toe, the surface of said cam pin between the head and toe thereof, on one side, being eccentric with the surface on the opposite side, said pin being provided with a short projecting end, engageable with an aperture formed in the end of said shaft, said cam pin being disposed through said aperture in said cam plate and having the toe thereof engageable with the end of said shaft and said cam, to press the same apart, and means for releasing said toe from engagement with said cam.

10. The combination with a shaft and a wheel, provided with clutch means, mounted to freely rotate thereon; of a spring-pressed clutch member non-rotatably mounted on the end of said shaft and axially slidable thereon, a cam plate carried by the outer face of said clutch member, and provided with a central aperture and a cam concentric with said aperture, a cam pin provided with a head and a toe, said cam pin being provided with a short projecting end, engageable with an aperture formed in the end of said shaft, said cam pin being disposed through the aperture in said cam plate and having the toe thereof engageable with the end of said shaft and said cam, to press the same apart, and means for releasing said toe from engagement with said cam.

11. The combination with a shaft and a wheel, provided with clutch means, mounted to freely rotate thereon; an annular axially slidable clutch part, non-rotatably mounted on the end of said shaft and wedge-shaped means disposed to act between said axially slidable part and a rotating non-axially slidable part.

In testimony whereof, I have hereunto signed my name in the presence of two subscribing witnesses.

FRANK H. WILLIAMS.

Witnesses:
J. WM. ELLIS,
WALTER H. KELLEY.

---

Copies of this patent may be obtained for five cents each, by addressing the "Commissioner of Patents, Washington, D. C."